Oct. 27, 1942.  A. T. POTTER  2,299,928
SLIDING SEAT STRUCTURE
Filed July 27, 1940   2 Sheets-Sheet 1
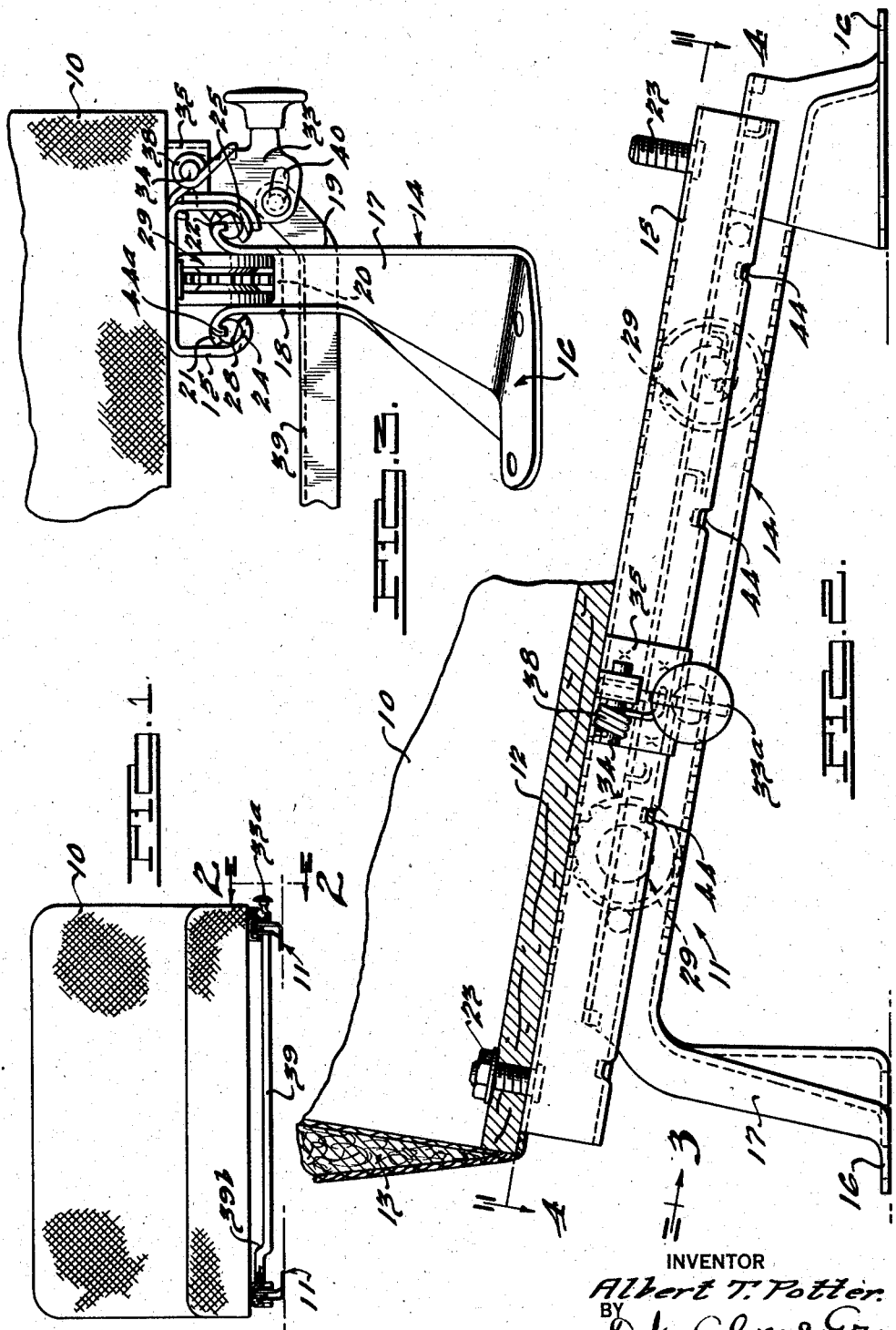
INVENTOR
Albert T. Potter.
BY
Dike, Calver & Gray
ATTORNEYS.

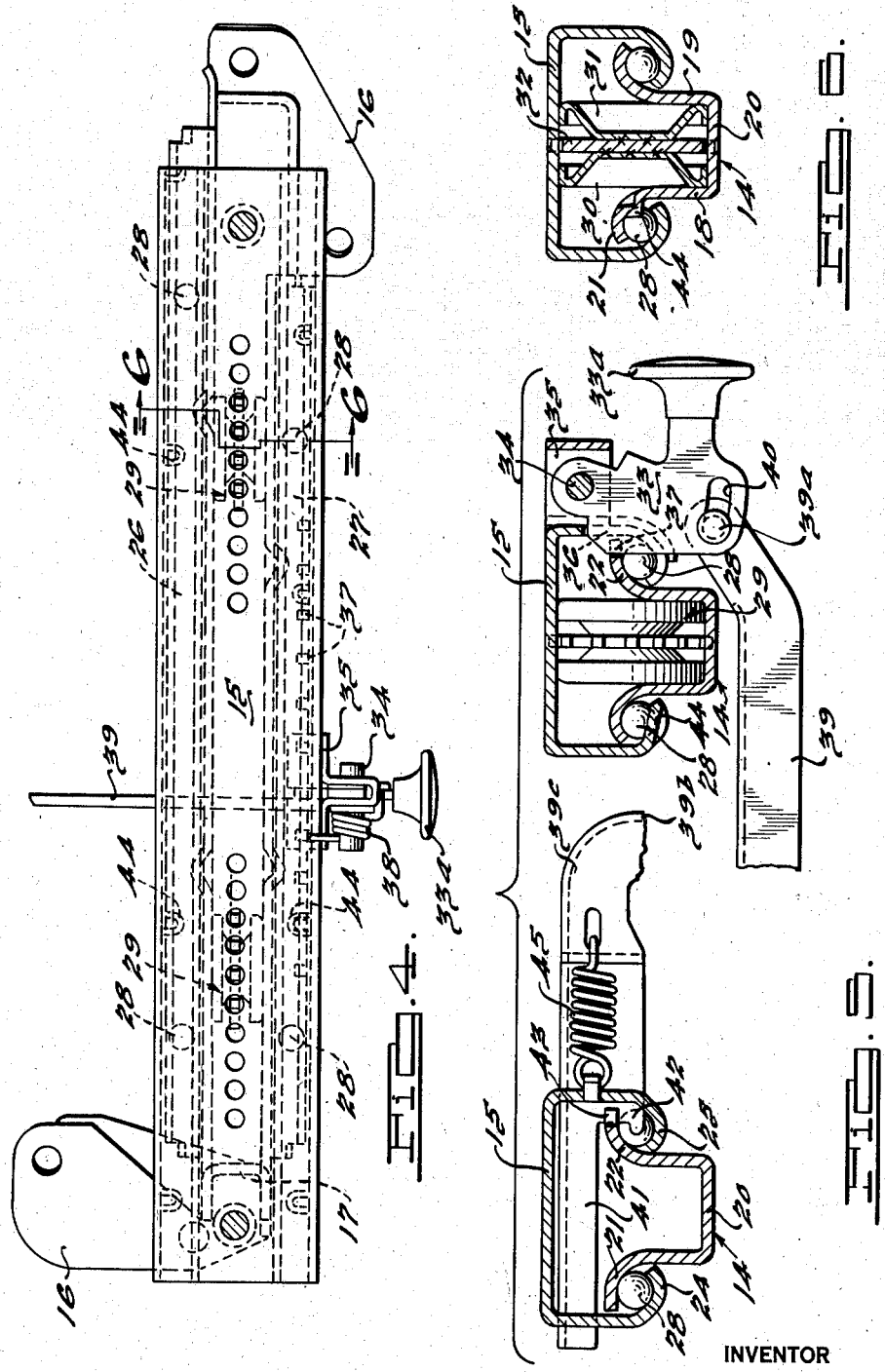

Patented Oct. 27, 1942

2,299,928

UNITED STATES PATENT OFFICE 2,299,928

SLIDING SEAT STRUCTURE

Albert T. Potter, Grosse Pointe, Mich., assignor to Ainsworth Manufacturing Corporation, Detroit, Mich., a corporation of Michigan Application July 27, 1940, Serial No. 347,852

7 Claims. (Cl. 155—14)

This invention relates to new and useful improvements in sliding seat structures particularly adapted for use in motor vehicles, an object of the invention being to provide a vehicle seat structure having improved means for supporting the seat for adjustment in a longitudinal direction and for locking the seat in a desired adjusted position.

Another object of the invention is to provide a sliding seat structure for a motor vehicle having improved latch mechanism under the control of the vehicle operator or passenger for simultaneously locking the seat at opposite sides thereof, the latch mechanism being so constructed and operable as to ensure locking of the seat in any adjusted position regardless of whether or not the seat during adjustment is tilted or cocked sidewise slightly to such an extent as to misaline the latch devices at opposite lateral sides of the seat.

A further object of the invention is to provide a simplified sliding seat structure which is economical to manufacture, which is easily and conveniently adjustable to a desired position, and which is positive and effective in operation.

Another important object of the invention is the provision of a slidable seat structure incorporating improved locking or latching means, preventing a sliding or shifting of the seat except after actuation of the locking means to an unlocked position for adjustably shifting the seat, whereupon the locking means may be released to spring to a position locking the seat in its adjusted position. In this connection, the present invention provides for a locking of the seat on both of its lateral sides and includes novel means for operating the locking mechanism from a single operating lever and for insuring positive locking action on both sides of the seat when the latter is shifted to any one of its adjusted positions even if the seat is tilted sidewise or moved further on one side than on the other during adjustment.

A further object of the invention is to provide an improved adjustable seat structure having spaced longitudinally extending seat slides of the telescopic channel type and embodying improved anti-friction elements interposed between the relatively slidable members effective to facilitate and improve the operation of the seat when longitudinal adjustment is desired. More specifically, I provide a channeled support invertedly secured to the seat, and an upright channeled support secured to the vehicle floor provided with out-turned flanges overlying inturned flanges extending from the side walls of the inverted channeled support. A plurality of disk rollers spacing the webs of said channeled supports are provided, as are ball rollers between the spaced flanges of said members. The disk and ball rollers are free to move relative to both channel members thereby providing a simplified but substantially frictionless structure, and one which insures easy and positive sliding movement between the seat supports for effective and convenient sliding movement of the seat to desired adjusted positions.

Other objects of this invention will appear in the following description and appended claims, reference being had to the accompanying drawings forming a part of this specification wherein like reference characters designate corresponding parts in the several views.

Fig. 1 is a front elevation of a preferred embodiment of the present invention.

Fig. 2 is a side elevation taken substantially along the lines 2—2 of Fig. 1 looking in the direction of the arrows. In this view the seat itself is in section, and is but partially shown.

Fig. 3 is a partial end elevation and is taken substantially along the lines 3—3 of Fig. 2 looking in the direction of the arrows.

Fig. 4 is a top plan view taken substantially along the lines 4—4 of Fig. 2 looking in the direction of the arrows.

Fig. 5 is a cross sectional view showing, in particular, one embodiment of a locking means utilized in connection with the present invention. In this view the elongated locking link connected to the pivoted locking lever is broken off.

Fig. 6 is a cross sectional view taken substantially along the staggered section lines 6—6 of Fig. 4 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings, a conventional seat is indicated generally at 10. For example, this seat may be the driver's seat of an automotive vehicle and is adapted for a fore and aft bodily shifting or sliding movement. The seat 10 is supported upon a suitable supporting surface, such as the floor of the vehicle, by means of a pair of supporting devices indicated generally at 11, 11. Each supporting device 11 is positioned beneath the seat 10 and extends adjacent to and in approximate parallelism with one lateral side thereof. The supporting devices 11 are identical in construction except that the right-hand one, as viewed in Fig. 1, is provided with a manually operable lever capable of operating the latch devices at both sides of the seat. Accordingly, a description of one of the supporting devices will suffice as the description of both such devices, except insofar as the locking mechanism is concerned which will be separately described hereinafter.

Referring to Fig. 2, it will be noted that the seat 10 includes the usual rigid frame 12 provided with a padded covering 13, and that the supporting devices 11, 11 are interposed between the bottom of the frame 12 and the supporting surface, such as the vehicle floor. Each supporting device 11 comprises a fixed supporting member 14 adapted for attachment to the supporting surface or floor, and a movable supporting member or slide 15 fixed to the bottom of the seat frame 12. As best shown in Fig. 3, each of the members 14 and 15 is channeled and the channeled part of member 14 is telescopically received within the member 15, so that the movable member 15 is slidable with respect to the fixed member 14 for moving or shifting the seat 10 into desired adjusted positions.

Referring more expressly to the construction of the supporting devices 11, the attachable fixed supporting member 14 thereof is provided with a base flange 16 adapted for attachment to the vehicle floor (Fig. 3). This attachable fixed supporting member 14 possesses an upstanding portion 17 provided with generally vertical walls 18 and 19. In addition, the upstanding portion 17 of the attachable member 14 possesses a generally horizontally extending bridging piece 20 which together with the upper portions of the walls 18 and 19 forms an upwardly opening channel facing the seat 10, as clearly indicated in Fig. 3. The reference numerals 21 and 22 represent rounded laterally extending flangings turned outwardly from the longitudinal edge of each of the side walls 18 and 19. These flanges 21 and 22 are utilized to maintain the parts of the supporting devices 11 in assembled relationship and to provide a slide portion for the fixed supporting member 14 with respect to which the movable member 15 slides in the manner more fully explained hereinafter.

The slidable supporting member 15 is generally channel shaped as clearly illustrated in Figs. 3 and 5, but is somewhat wider than the channel portion of the attachable or fixed supporting member 14. The movable member 15 is fixed to the bottom of the seat frame 12 in an inverted position, that is, the web portion of the member 15 is secured directly against the bottom of the seat frame 12 by suitable fastening elements such as the bolts 23 (Fig. 2). The reference numerals 24 and 25 represent rounded lateral flanges turned inwardly from and extending along the side walls of the movable support 15. It will be observed that the movable support 15 is so arranged relative to the attachable fixed support 14 that the flanges 24 and 25 of the movable member 15 respectively underlie and are spaced from the flanges 21 and 22 of the fixed member 14. Moreover, since each of the flanges 21, 22, 24 and 25 are somewhat rounded, they provide a pair of longitudinal races 26 and 27 (Fig. 4) suitable to receive anti-friction elements, such as the ball bearings 28. In view of the foregoing, it will be appreciated that the movable support 15 is adapted for telescopic sliding movement with respect to the fixed member 14 and that the flanges 21, 22 are interlocked with the flanges 24 and 25 through the medium of the anti-friction elements 28 which in effect function as side thrust bearings holding the seat against cocking and causing it to travel in a true rectilinear path.

The reference numeral 29 represents in general disk rollers spacing the members 14 and 15. These rollers are generally vertically positioned and are maintained within the channel portion of the member 14, as clearly shown in Fig. 3. Since the rollers 29 space the members 14 and 15, they interiorly contact the spaced webs of the channels of the members 14 and 15. More specifically, the rollers 29 respectively contact the bridge member 20 of the fixed member 14, and the interior of the web portion of the slide member 15. It is to be observed that the disk rollers 29 are so constructed and dimensioned that they maintain the members 14 and 15 in assembled relationship for relative telescopic movement. Consequently, the disk rollers 29 have a diameter such that they space the flanges 21 and 22 from the flanges 24 and 25 sufficiently to provide the races 26 and 27 with a size suitable to accept the ball bearings 28. Expressed in a different way, the races 26 and 27 are formed by the spacing of the flanges 21 and 22 from the flanges 24 and 25, and this spacing is controlled by the diameter of the disk rollers 29 to be substantially equal to the diameter of the ball bearings 28. However, the flanges 21, 22, 24 and 25 are somewhat yieldable so that the ball bearings 28 may be maintained under a slight compression in the races 26 and 27. To make it certain that the balls 28 will not escape from the races 26 and 27, the flanges 21, 22, 24 and 25 may be provided with pressed out lugs to form obstructions or abutments in the races 26 and 27 as shown at 44, Figs. 2, 5 and 6. For the same purpose lugs 44a may be provided at the ends of the raceways, see Fig. 3.

As best shown in Fig. 6, the disk rollers 29 comprise a pair of stamped end pieces 30 and 31 provided with peripheral annular flange portions. The end pieces 30 and 31 are firmly fixed to a central gear-like member 32 by any suitable means such as by spot welding. The gear-like member 32, it will be noted, is provided with peripheral teeth which mesh in a series of linear longitudinally extending slots in the web portions of the members 14 and 15, see Figs. 2 and 4. Since these series of slots are arranged in the same general vertical plane, it will be appreciated that the disk rollers are adapted to move longitudinally of the members 14 and 15 through contact of the teeth of the gear-like member 32 in successive slots.

From the foregoing it will be seen that the entire downward vertical load is transmitted to the toothed rollers 29 which provide a wide bearing of substantial area and a large wheel diameter as compared with the balls 28, thus increasing the ease in which the seat can be moved fore and aft. These rollers 29 are freed from any material sidewise thrust or cramping action due to the side thrust bearings 28. Hence, frictional resistance to the free turning of the rollers is greatly minimized.

The seat may be locked in any one of a series of adjusted positions through the medium of latch mechanism operable at both lateral sides of the seat and controlled for operation in unison. As shown in Fig. 5, there is provided at one side of the seat a swinging latch or locking lever 33 which is pivoted at 34 to a bracket 35 secured, as by spot welding, to the outer flange of one of the slide members 15. The lever 33 has a latch portion extending freely through a slot 36 in the depending flange of the slide 15 and adapted to project into any one of a series of locking notches 37 formed along the marginal edge of the outturned flange 22 of the member 14. Projecting from the lever 33 is a handle or knob 33a which may be grasped to swing the lever 33 outwardly against the action of a spring 38 to release the latch member from a locking notch 37 and permit the seat to be adjusted. The spring 38 is coiled about the pivot 34 and has one end anchored to the slide member 15 and the opposite end anchored to the lever 33, the construction being such that the spring normally holds the locking lever in locking position within any one of the notches 37.

A transverse link 39 is connected at one end to the lower end of the lever 33 through the medium of a headed pin 39a extending through a curved slot 40 in the lever 33. The link 39 extends transversely through a slot in one of the supporting uprights 19, see Fig. 3, and has at the opposite side of the seat a vertical offset 39b providing an extension 39c of the link positioned in line with the slide member 15 at the opposite side of the seat, see Fig. 5. The end 39c of the link 39 is formed with an integral pilot guide 41 extending with a working fit through alined slots in the depending side flanges of the last mentioned slide 15. The link extension 39c is also formed with a latch portion 42 positioned to project into any one of a series of notches 43 formed along the edge of the flange 22 of the adjacent support 17. A coil spring 45 is connected at one end to the slide 15 and its opposite end is anchored to the link extension 39c and functions similarly to spring 38 to urge the latch 42 into locking position.

From the foregoing it will be seen that the link 39, by virtue of its lost motion connection at 40 with the latch 33, is capable of an independent movement relative to the latter. In the position of the parts shown in Fig. 5 both the latch 42 and the latch or lever 33 are in locking positions within notches 37 and 43, respectively, in the slide supports 17 at opposite sides of the seat. At this time the pin 39a is at one end of the slot 40 in the member 33, as shown. Hence, when the handle 33a is grasped to swing the lever 33 outwardly to unlock the seat at one side, this action will be transmitted positively by the link 39 to latch 42 and will unlock the seat at the opposite side. The seat may thereupon be adjusted longitudinally to the desired position and upon release of the handle 33a the latch 33 will be forced into a notch 37 by the spring 38. If, however, a notch 43 at the opposite side of the seat is not correctly alined with the latch portion 42, the latter under the influence of the spring 44 will be temporarily blocked against entering a notch 43. This, however, will not prevent the latch 33 from entering a notch 37 since the lost motion connection 39a and 40 between the latch members at opposite sides of the seat permits independent movement of these latch members into locking positions within the notches. Thus, it will be seen that the independent action of the latch members at opposite sides of the seat in moving under the influence of their springs into locking positions will accommodate possible conditions in which the seat may be slightly cocked, thereby throwing the locking notches at opposite sides of the seat out of exact alinement. Moreover, this independent action of the latch members will compensate for inaccuracies in assembly or in manufacture where the locking notches are not in true alinement at opposite sides of the seat. In case either one of the latch members enters its locking notch or recess in advance of the other, when handle 33a is released, the latch which is blocked will eventually snap into locking position after the seat has assumed its normal position after adjustment. Since the seat during operation of the vehicle is subjected to forces tending to rock or tilt it sidewise either one of the locking members, temporarily held out of locking position by mis-alignment of the parts, will eventually be forced home by reason of slight tilting action of the seat permitted on account of the existence of play between the parts.

I claim:

1. A sliding seat structure, comprising a channel member adapted to be secured to the bottom of a seat and having spaced depending side flanges terminating in inturned flanges at their lower edges, a fixed channel member telescoped in said first named channel member and having upwardly extending side flanges terminating in out-turned flanges overlying said inturned flanges, anti-friction rolling elements interposed between said out-turned and inturned flanges and substantially free of vertical load imposed by the weight of the seat, and rollers interposed between the central web portions of said channel members, said rollers having materially greater diameter than said elements and formed with peripheral teeth meshing in apertures formed in said webs and arranged to transmit to said fixed channel member vertical load imposed by the weight of the seat.

2. A sliding seat structure, comprising a channel member adapted to be secured to the bottom of a seat and having spaced depending side flanges terminating in inturned flanges at their lower edges, a fixed channel member telescoped in said first named channel member and having upwardly extending side flanges terminating in out-turned flanges overlying said inturned flanges, anti-friction rolling elements interposed between said out-turned and inturned flanges and substantially free of vertical load imposed by the weight of the seat, and rollers interposed between the central web portions of said channel members, said rollers having materially greater diameter than said elements and formed with peripheral teeth meshing in apertures formed in said webs and arranged to transmit to said fixed channel member vertical load imposed by the weight of the seat, said rollers having an effective bearing contact on the web portion of the fixed channel member substantially throughout the width of said web portion.

3. A sliding seat structure, comprising a pair of relatively slidable channel members arranged in telescopic relation, one adapted to be fixed to a seat and the other adapted to be fixed to a fixed support, one of said members having inturned flanges and the other having out-turned flanges arranged to form raceways longitudinally of the seat, rolling elements arranged in said raceways and effective to maintain said flanges in interlocked relation, said channel members being constructed and arranged whereby said elements are substantially free of vertical load imposed by the weight of the seat, and disk rollers interposed between the central web portions of the channel members and effective to transmit from one channel member to the other substantially all downward vertical loads.

4. A sliding seat structure, comprising a pair of relatively slidable channel members arranged in telescopic relation, one adapted to be fixed to a seat and the other adapted to be fixed to a fixed support, one of said members having in-turned flanges and the other having out-turned flanges arranged to form raceways longitudinally of the seat, rolling elements arranged in said raceways and effective to maintain said flanges in interlocked relation, said channel members being constructed and arranged whereby said elements are substantially free of vertical load imposed by the weight of the seat, and disk rollers interposed between the central web portions of the channel members and effective to transmit from one channel member to the other substantially all downward vertical loads, each of said rollers having materially greater diameter than any one of said elements and having a bearing surface on the web portion of the lower channel member substantially equal to the width of such web portion.

5. A sliding seat structure, comprising a pair of relatively slidable channel members arranged in telescopic relation, one adapted to be fixed to a seat and the other adapted to be fixed to a fixed support, one of said members having in-turned flanges and the other having out-turned flanges arranged to form raceways longitudinally of the seat, rolling elements arranged in said raceways and effective to maintain said flanges in interlocked relation, said channel members being constructed and arranged whereby said elements are substantially free of vertical load imposed by the weight of the seat, and disk rollers interposed between the central web portions of the channel members and effective to transmit from one channel member to the other substantially all downward vertical loads, each of said rollers having materially greater diameter than any one of said elements and having a bearing surface on the web portion of the lower channel member substantially equal to the width of such web portion, said rollers having peripheral teeth meshing in apertures in said web portions.

6. A sliding seat structure, comprising an upper longitudinally extending channel member adapted to be secured in inverted position to the bottom of a seat, a lower fixed channel member facing upwardly and telescoped with the upper member, said channel members at each side having vertically spaced flanges cooperating to provide a raceway, anti-friction ball bearings arranged in each raceway, a plurality of toothed wheels interposed between said channel members and located between said raceways and each having a diameter materially greater than the height of either raceway, the lower channel member having a bottom central web lying below said raceways and supporting said wheels for longitudinal rolling movement.

7. A sliding seat structure, comprising an upper longitudinally extending channel member adapted to be secured in inverted position to the bottom of a seat, a lower fixed channel member facing upwardly and telescoped with the upper member, said channel members at each side having vertically spaced flanges cooperating to provide a raceway, anti-friction ball bearings arranged in each raceway, a plurality of toothed wheels interposed between said channel members and located between said raceways and each having a diameter materially greater than the height of either raceway, said flanges being arranged whereby substantially all downward vertical loads are transmitted from the upper channel member to the lower channel member through said wheels.

ALBERT T. POTTER.